Dec. 13, 1966   E. A. HENNINGSEN ET AL   3,291,325
SILO UNLOADER

Filed April 15, 1964                5 Sheets-Sheet 1

INVENTORS
E. A. HENNINGSEN, R. S. WILKES &
A. B. SKROMME
BY
William A. Murray
ATTORNEY

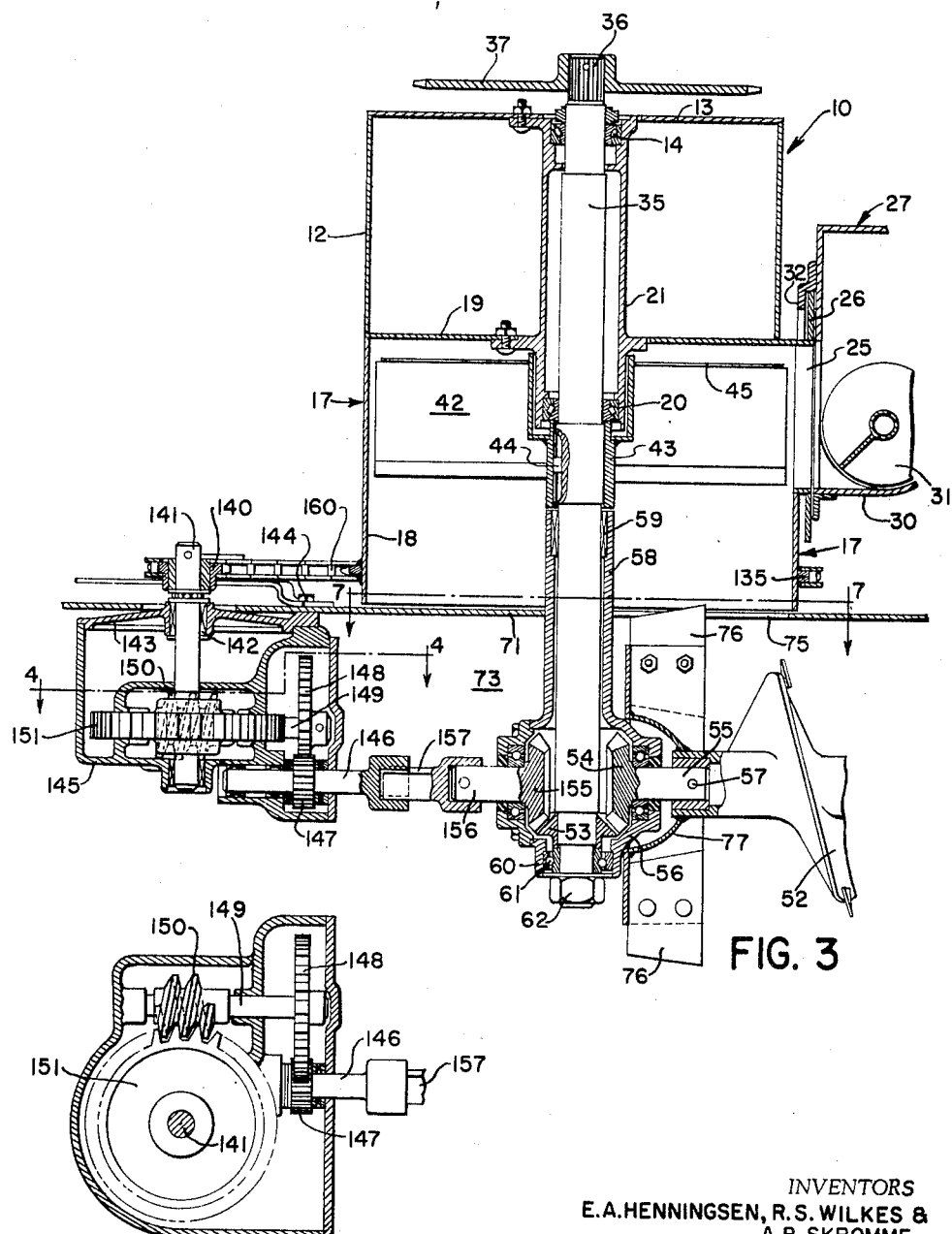

Dec. 13, 1966  E. A. HENNINGSEN ETAL  3,291,325
SILO UNLOADER

Filed April 15, 1964                                5 Sheets-Sheet 4

INVENTORS
E.A.HENNINGSEN, R.S.WILKES &
A.B.SKROMME
BY

*William A. Murray*
ATTORNEY

Dec. 13, 1966   E. A. HENNINGSEN ETAL   3,291,325
SILO UNLOADER
Filed April 15, 1964                                5 Sheets-Sheet 5
FIG. 8
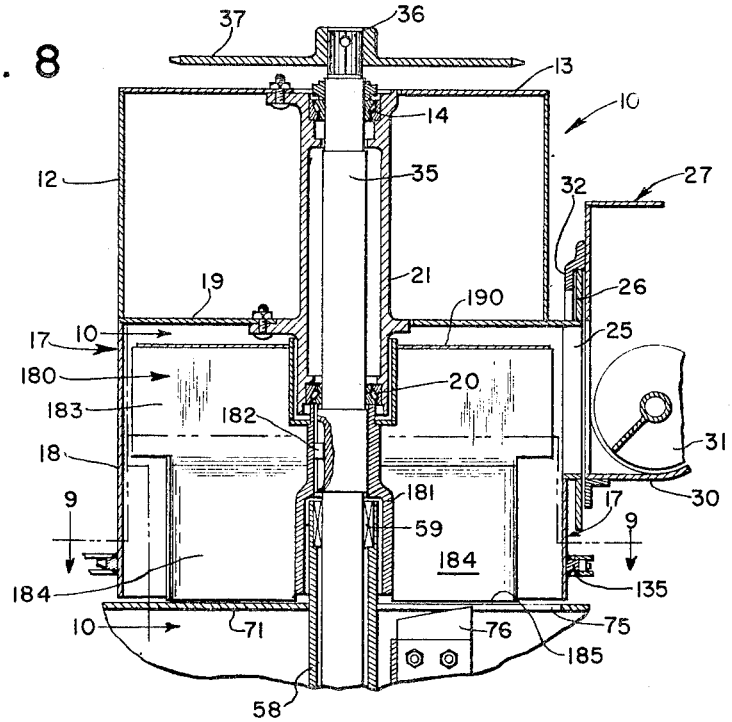
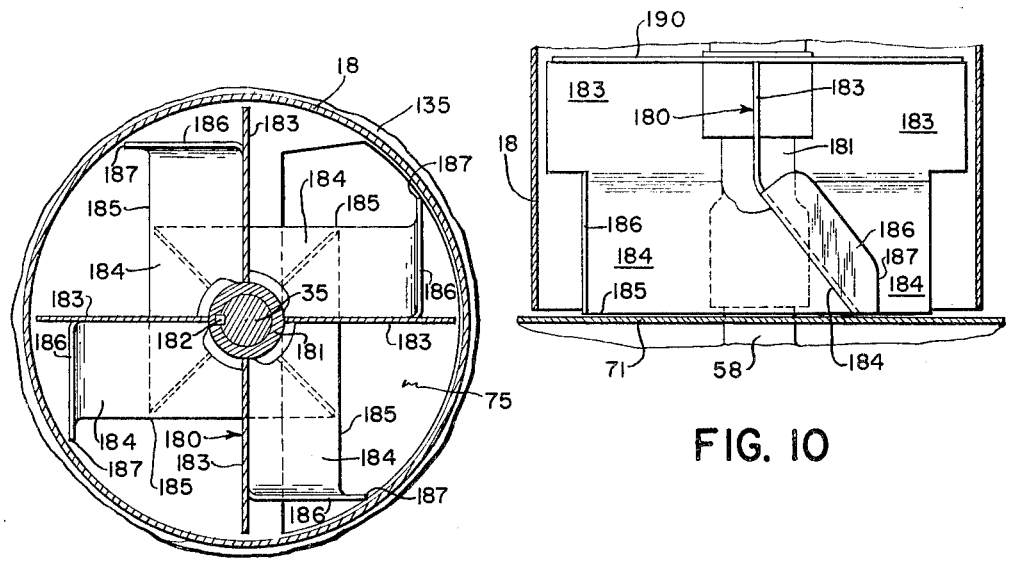
FIG. 9
FIG. 10
INVENTORS
E. A. HENNINGSEN, R.S. WILKES &
A.B. SKROMME
BY William A. Murray
ATTORNEY United States Patent Office 3,291,325
Patented Dec. 13, 1966

3,291,325
SILO UNLOADER
Etlar A. Henningsen, Geneseo, and Raymond S. Wilkes and Arnold B. Skromme, Moline, Ill., assignors to Deere & Company, Moline, Ill., a corporation of Delaware
Filed Apr. 15, 1964, Ser. No. 359,948
11 Claims. (Cl. 214—17)

This invention relates to a silo unloader adapted to move material from the surface of the material contained in a silo and to discharge the material out one side of the silo. Still more particularly this invention relates to a drive mechanism for operating to move the unloader over the surface of the silo. Even still more particularly this invention relates to a leveling mechanism associated with the silo unloader for maintaining the surface of the silage relatively level.

It is a primary object of the present invention to provide a new and novel structure for driving the silo unloader over the surface of the silage. Included as part of the structure is an upright material receiving chamber at the center of the silo fixed against rotation. Operating in conjunction with the chamber is a radial sweep adapted to move over the surface of the silage and convey material inwardly to the chamber. Drive mechanism is provided adjacent the chamber and operates to drive a sprocket on the sweep spaced radially from the chamber. The sprocket is drivingly connected to a sprocket fixed against rotation on the surface of the chamber so that as the chain interconnecting the two sprockets rotates due to the rotation of the drive sprocket, it will effect driving of the sweep angularly about the chamber.

A further object of the invention is to provide an impeller in the chamber rotatable about an upright axis. The chamber is closed at its lower end by a panel adapted to move with the sweep structure. Specifically the panel is part of an overlying housing provided over the sweep auger that extends under and is closely adjacent the lower peripheral edge of the chamber. The panel has an opening offset to one side of the vertical center of the chamber to pass material into the chamber. The impeller blades operate to drive material out of the chamber into the discharge conveyor.

In a modified form of the invention the side discharge opening in the chamber is spaced above the panel and the impeller blades are formed to both raise the material from the panel as well as drive it outwardly.

Other objects and advantages of the present invention will become apparent to those skilled in the art as the nature of the invention is better understood from the following description and as shown in the accompanying drawings.

FIG. 3 is a vertical sectional view through the center portion of the silo unloader.

FIG. 4 is a sectional view taken substantially along the line 4—4 of FIG. 3.

FIG. 8 is a view similar to FIG. 3, but showing a modified form of the impeller blade structure.

FIG. 9 is a sectional view taken substantially along the line 9—9 of FIG. 8.

FIG. 10 is a sectional view taken substantially along the line 10—10 of FIG. 8.

Figure 1:
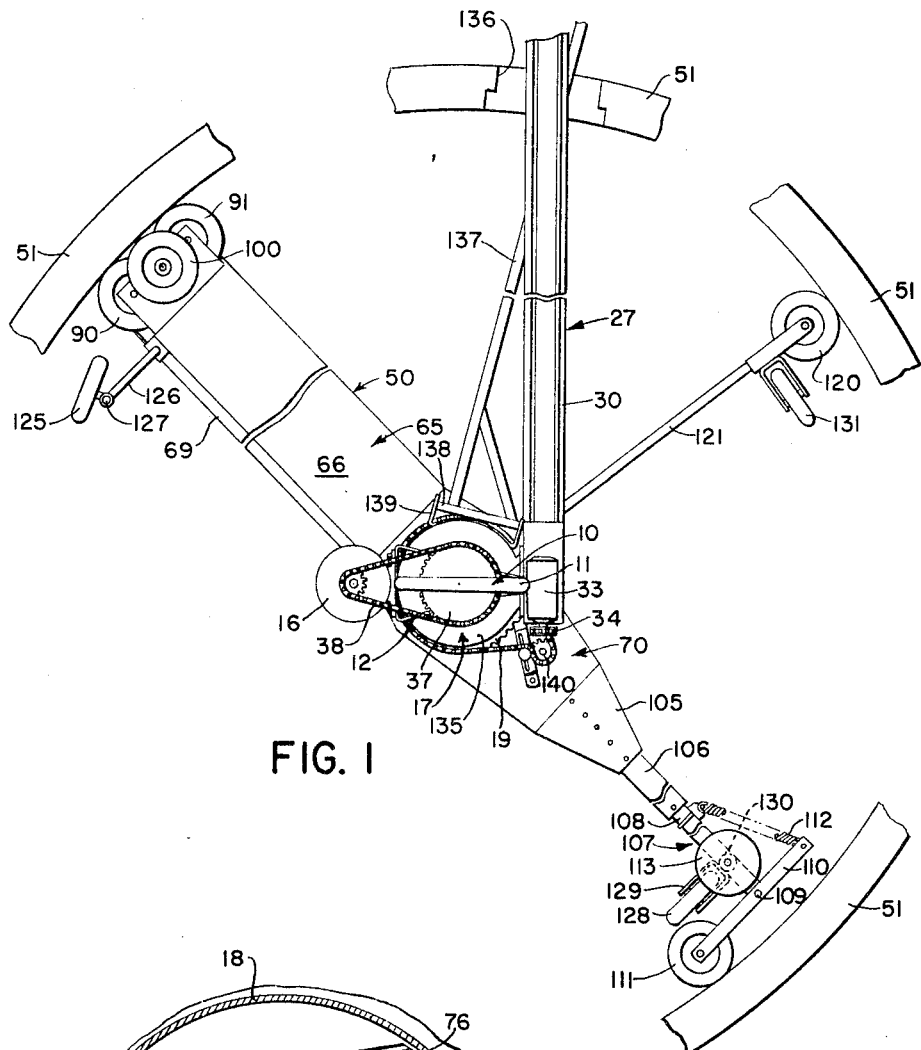
FIG. 1 is a plan view of the entire silo unloader with portions of the silo unloader removed.
Figure 7:
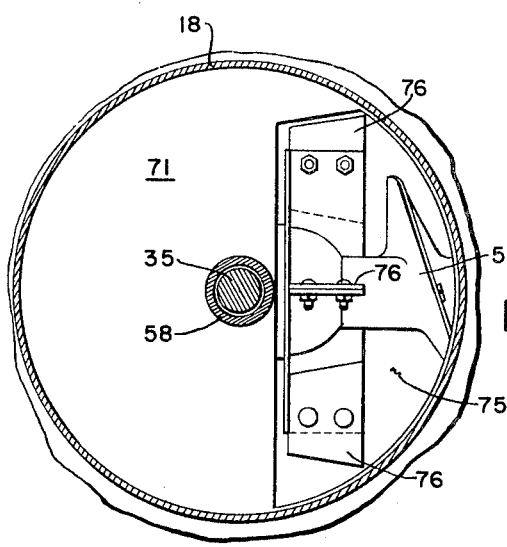
FIG. 7 is a sectional view taken substantially along the line 7—7 of FIG. 3.

The silo unloader is of the type disposed on the surface of the silage and adapted to move over the surface and remove a top layer of silage. As is conventional, such a silo unloader is normally supported from the top of the silo by a cable, not shown, that extends downwardly and is connected to a main support, indicated in its entirety by the reference numeral 10, disposed centrally in the silo. The upright support is composed in a part of a U-shaped main member 11 directed downwardly and connected at its lower ends to a triangular shaped structure 12 having an overhead plate 13 supporting an upper journal 14 and an outer upright plate structure 15 serving as the support for the main power source, in the present instance an electric motor 16. Welded to the lower edges of the triangular shaped structure 12 is a downwardly opening material receiving chamber 17 having an annular upright wall 18 and an overhead wall 19 supporting a centrally located journal 20. The journals 14, 20 are carried in an upright journal housing 21 extending through the overhead walls 13, 19. The chamber 17 has a material discharge opening 25 at one side thereof with a round plate or flange 26 surrounding the opening 25 and serving as a horizontal pivot member for an auger type conveyor 27. The auger conveyor 27 has an intake end receiving material directly from the opening 25 and includes a housing 30 enclosing an auger 31 and connected to the flange 26 by means of an overlapping lip 32 extending over the rounded edge of the flange 26 and completing with the flange 26 a horizontal pivot permitting the entire conveyor 27 to move vertically. A separate electric motor 33 is supported on the top surface of the housing 30 and drives the auger 31 by a chain drive 34.

Figure 2:
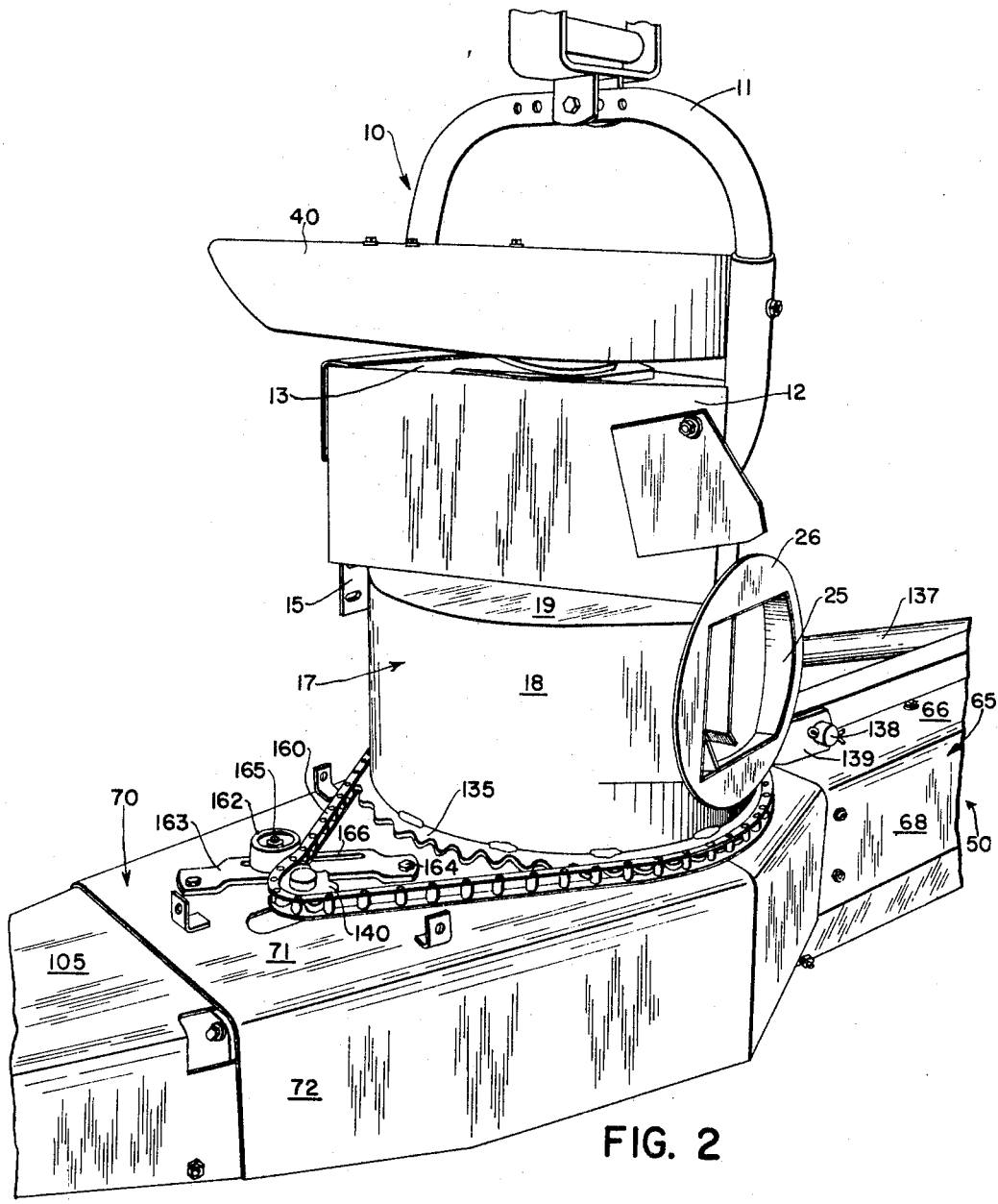
FIG. 2 is a side perspective view of the center portion of the silo unloader.

An upright shaft 35 is rotatably carried by the journals 14, 20 and has its upper end projecting above the overhead panel 13 and splined at 36 to a horizontal sprocket 37 connected by a chain drive 38 to the electric motor 16. A suitable shield 40, shown only in FIG. 2, is provided over the chain drive. Impeller blades 42 are disposed in the chamber 17 and have a common central hub portion 43 keyed, as at 44, to the shaft 35. The top edges of blades 42 are welded to an overhead plate 45. The impeller blades 42 operate to move material through the opening 25 and into contact with the auger 31.

The sweep structure, indicated in its entirety by the reference numeral 50, extends diametrically across the silo and contacts at its opposite ends the silo wall 51. The sweep structure 50 is composed in part of an auger 52 extending from an inner end adjacent the lower end of the main drive shaft 35 to an outer end closely adjacent the silo wall 51. The inner end of the auger 52 is drivingly connected to the lower end of the shaft 35 by bevel gears 53, 54 connected respectively to the shaft 35 and to a short stub shaft 55 extending horizontally outwardly of a gear housing 56. The outer end of the shaft 55 is conected to the central auger 52 by means of a pin 57. The gear housing 56 has an upper vertically disposed neck portion 58 concentric with the shaft 35 extending upwardly to a point adjacent the lower edge of the impeller hub 43. Internal bearings 59, 61 permit the portion 58 to rotate on the lower end of the shaft 35. The housing 56 also includes a lower downwardly projecting portion 60 having an internal bearing 61 engaging the extreme lower end of the shaft 35. The lower end of the shaft 35 is threaded to receive a nut 62 for retaining the entire housing 56 on the shaft 35. However, the bearings 59, 61 permit the entire housing 56 to rotate relative to the shaft 35 and consequently permit the entire auger to sweep angularly over the silage and about the inner end of the auger.

Besides the auger 52, the sweep structure 50 includes a U-shaped housing 65 inverted to open downwardly and to cover the auger 52. The housing 65 includes a laterally disposed overhead panel 66, a leading vertical panel 67 and a vertical trailing panel 68. Outer extensions 66', 67' and 68' are provided on the end of the housing 65. The lower edge portions of the panels 67, 67' are turned upwardly as at 69, 69' to expose the lower half of the auger 52. The trailing panels 68, 68' extend downwardly to substantially the lower edge of the auger 52. The housing structure includes a central portion 70 having an overhead panel 71 and depending vertical panels 72, 73 forming continuations of the outer housing 65 and the respective panels. The overhead panel 71 extends beneath, but closely adjacent the lower edges of the chamber 18 and has an upwardly extending opening 75 offset to one side of the shaft 35 and adjacent the inner end of the auger 52. Directly beneath the opening 75 is provided on the inner end of the central shaft portion of the auger 52 radially extending flexible flipper elements 76 bolted to a cast hub 77 welded to the auger 52. The flipper elements 76 operate to move material upwardly through the opening 75.

Figure 5:
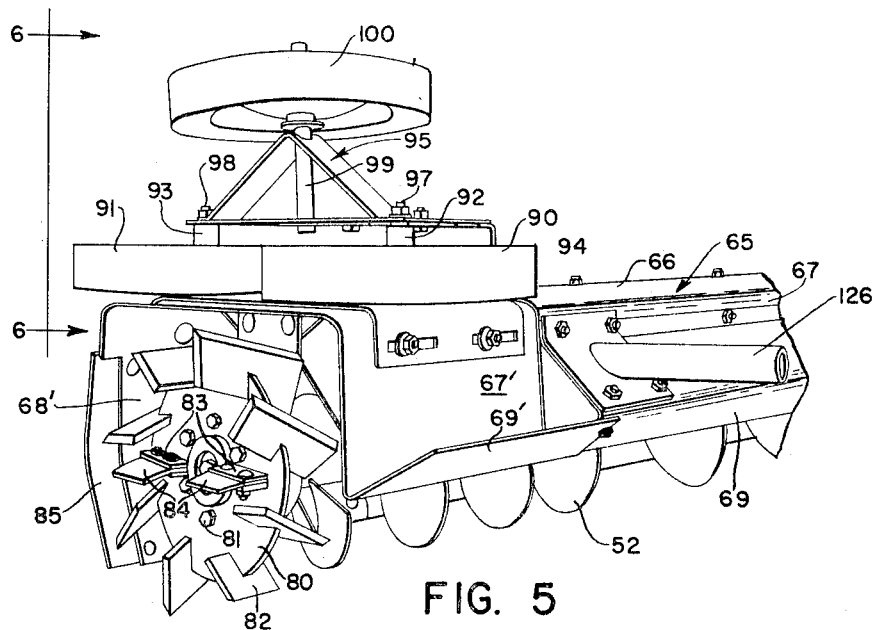
FIG. 5 is a side perspective view of the outer end of the sweep.
Figure 6:
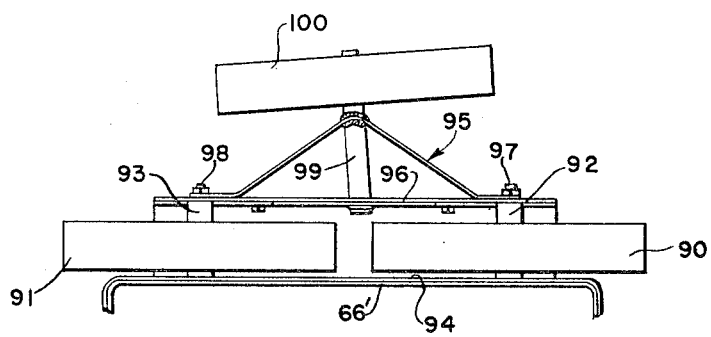
FIG. 6 is an end view of the upper portion of the sweep of the silo unloader as taken substantially along the line 6—6 of FIG. 5.

Referring now to FIG. 5, the outer end of the auger 52 is provided with a wall-scraping device composed in part of a vertical plate 80 bolted, as at 81, to rotate in unison with the auger 52 and having axially extending scraper blades 82 fixed to the outer surface of the plate 80 and projecting toward and in close proximity to the wall of the silo. Fixed to outwardly projecting brackets 83 projecting from the face of the plate 80 are flexible brush elements 84 projecting beyond the scraper edges of the scraper elements 82 and normally engaging the wall of the silo. The flexible brushes may be made of any of a series of flexible elements, tire carcasses being ideally suited for such use. The scraping device operates to utilize the blade elements 82 for chipping frozen and packed silage and other material away from the wall. However, in many instances silage will be retained on the wall even after chipping occurs and it is the purpose of the brushes 84 to brush the relatively loosely held silage from the wall. As a further aid in brushing material from the wall is a rubber extension 85 projecting from the rear housing panel 68' and contacting the wall.

Also located at the outer end of the sweep structure 50 is a leveling device composed of a pair of horizontally disposed guide wheels 90, 91 rotatably carried on upright shafts 92, 93 respectively projecting upwardly from the upper horizontal panel extension 66'. Suitable reinforcing, such as a plate 94, overlies the panel extension 66' for the purpose of adding structural rigidity at that end of the structure. The shafts 92, 93 are interconnected by an A-frame 95 having horizontally disposed plate structure 96 extending between and directly connected to the shafts 92, 93 by means of nuts 97, 98. An inclined wheel shaft 99 extends through the apex portion of the A-frame 95 and the interconnecting plate portion 96 at the base of the A-frame. The shaft 99 is inclined in a trailing direction and supports at its upper end a third or vertically offset wheel 100. The two wheels 90, 91 nominally engage the wall 51 of the silo and the upper wheel is offset slightly away from the wall 51. However, should the radial structure dip or tilt downwardly at its lower end, the upper wheel 100 will engage the wall and due to its inclination tend to track upwardly to thereby raise the outer end of the radial structure. This type of leveling system is automatic since upon the radial structure and particularly the auger 52 passing a low side or dip in the silage, the outer end of the auger will dip downwardly to cause the wheel 100 to engage the wall and drive the auger 52 upwardly and out of contact with or to reduce the depth of cut of the silage. Consequently at the location or spots in the silo where the silage is low, a leveling system consisting of the three wheels 90, 91 and 100 will tend to prevent surface removal of material by the auger 52.

The central housing portion 70 tapers inwardly, as at 105, and is connected to an outer beam extension 106 telescopingly receiving a pressure structure, indicated in its entirety by the reference numeral 107. The unit 107 is composed in part of a radial beam member 108 projecting from the extension 106 and pivotally connected at 109 at its outer end to an arm 110 having a pressure wheel 111 connected at one end. The arm 110 has a spring 112 connected to its opposite end and extending from that end to an inner portion of the beam member 108. The beam 108 also carries a weight, indicated at 113, for maintaining balance of the entire sweep structure 50. As is obvious, the spring 112 maintains the wheel 111 in contact with the wall 51 and also retains a similar pressure between the wheels 90, 91 and the wall 51.

A third guide wheel 120 is supported on an arm 121 projecting from the central upright structure substantially at 90° from the wheels 90, 91 and 111. While the pressure wheel 111 maintains pressure between the wheels 90, 91 and the wall 51, the wheel 120 through its arm 121 serves primarily the purpose of retaining the chamber 18 and the entire upright supporting structure 10 substantially at the center of the silo.

Provided on the sweep structure 50 and adjacent the outer end of the auger portion of the sweep structure is a gauge wheel 125 carried on a rigid arm 126 that projects in advance of the sweep structure 50. The wheel 125 is mounted by means 127 on the end of the arm 126. The wheel 125 supports the auger portion of the sweep structure 50 in a manner that the lip 69 and lip extension 69' are positioned several inches above the surface of the silage and prevents gouging or dipping of the leading edge of the auger portion into the silage.

Supported on the arm portion 108 at substantially 180° from the previous gauge wheel is a second gauge wheel 128 supported, as at 130, to an arm 129. Similarly, adjacent the wheel 120 and supported on a structure, not shown, but retained on the outer end of the arm 121 is a third gauge wheel 131. It should be recognized that the wheels 125, 128 and 131 primarily serve to prevent radial structures and the guide wheels 90, 91, 111 and 120 from engaging the surface of the silage and thereby retaining them for their primary purpose which is to engage the wall 51.

The entire sweep structure 50 is moved about the surface of the silage by a method considered unique in the present invention. Supported on the chamber wall 18 and externally thereof is an annular sprocket member 135. The sprocket 135 as well as the chamber 18 is generally held against rotation partially by the conveyor structure 27 that extends through the side opening 136 in the silo wall 51 and partially by a torque arm 137 pivotally carried on horizontal pivot means 138 supported on bracket structure 139 welded to the outer face of the chamber 18. Both the conveyor 27 and the torque arm 137 will engage the edge of the opening 136 and will, of course, lock the chamber 18 against rotation about the upright shaft 35.

Radially spaced from the sprocket 135 and substantially on the same level is a drive sprocket 140 fixed to an upright vertical shaft 141 journaled at 142 to a bearing support 143. The support 143 is bolted at 144 to the overhead panel 71. The support 143 also serves as a cap for a gear housing, indicated in its entirety by the reference numeral 145.

The vertical shaft 141 is driven by a horizontal input shaft 146 through a series of speed reducing gears including a pair of spur gears 147, 148, the latter being fixed to a countershaft 149 carrying a worm gear 150. The worm gear 150 meshes with a gear 151 fixed to the upright shaft 141. The entire speed reducing gear cluster is contained in the housing 145.

The input shaft 146 is connected to the vertical main drive shaft 35 by means of a bevel gear 155 having a stub shaft 156, the latter being connected to the shaft 146 by means of a coupling, indicated in its entirety by the reference numeral 157. The bevel gear 155 meshes with the lower horizontal bevel gear 53 fixed to the vertical drive shaft 35. It therefore becomes apparent that upon power being delivered to the vertical drive shaft 35 the auger structure 52 will rotate and power will be transmitted to the drive sprocket 140. The drive sprocket 140 is connected to the fixed sprocket 135 on the chamber 17 by means of a continuous flexible element or chain 160. Since the sprocket 135 is fixed against rotation, as the sprocket 140 is driven the entire sweep structure 50 will be driven angularly about the axis of the shaft 35 and over the surface of the silage. A take-up idler 162 is supported on the surface 71 of the central housing structure by means of a bracket 163 bolted at 164 to the panel 71. The idler wheel 162 engages the back of the chain 160. It is bolted to the bracket 163 by a bolt 165 extending through a slot 166 and consequently is capable of being shifted along the slot for purposes of take-up in the chain 160.

In operation the silo unloader moves silage by augering the material by the auger 52 inwardly as the entire structure 50 sweeps over the surface of the silage. The flipper 76 receives the silage from the auger 52 and moves it upwardly through the opening 75 and into the path of the impeller blades 42. The impeller blades 42 move the material through the side opening 25 and into contact with the discharge auger 31. The discharge auger 31 moves it through the side opening 136. The flipper blade 76 and impeller blade 42 do in fact operate as impeller means for moving the silage from the inner end of the auger 52 and into the auger 31. The portion of the overhead panel 71 disposed under the open side of the chamber 17 will operate as a shelf to receive the material and retain the material from gravitating back into the underside of the chamber. A small buildup of material will not affect the efficient operation of the structure and does in fact operate as a place or location to build up material so that should excess silage be moved into the chamber, there will be a place for it to move without creating a clogging condition within the chamber. The overhead plate 45 prevents material from moving upwardly and wrapping around the central hub members.

Referring to the modified form of the invention shown in FIGS. 8–10, the chamber 17 is identical to the previous form and the side discharge 25 is positioned as in the previous form spacedly above the panel 71. Impeller blades 180 extend radially from a central hub portion 181 extending substantially the height of the chamber as measured between the panels 19 and 71. The hub 181 is keyed at 182 to the shaft 35 and overlies the lower end of housing 21 and the upper end of the housing portion 58.

The impeller blades 180 are each composed of an upper vertically disposed portion 183 generally opposite to and at the general level of the opening 25. A lower portion 184 continues downwardly in an inclined manner from the upper portion to a lower horizontal edge 185 closely adjacent to the floor or panel 71 and in a leading or advanced relation to the upper portion. A vertical flange extends in a leading or advanced direction at the outer end of the lower portion 184 and has a lower vertical edge 187 extending to a position closely adjacent the chamber wall 18 and operates, upon rotation of the blades 180 to maintain the base of the chamber clear of material. The inner ends or edges of the lower portions 184 are welded partially to the undersurface of the next adjacent lower portion 184 and partially to the hub 181. An overhead plate 190 rigidly interconnects the upper edges of the blades 180.

The modified portion of the impeller operates to sweep over the panel 71 and to both raise the material to the height of the opening 25 as well as driving it outwardly through the opening. The end flanges 106 prevents material from impelling against the lower portions of the chamber wall 18.

While only the preferred forms of the invention have been shown, it should be recognized that other forms and variation will occur to those skilled in the art. Therefore while the present forms have been shown and described in concise and detailed manner for the purpose of clearly and concisely illustrating the principles of the invention, it should be understood that there is no intention to limit or narrow the invention beyond the broad concepts set forth in the appended claims.

What is claimed is:

1. A silo unloader for use with an upright silo wall having a side discharge opening comprising: an upright drive shaft centrally located in the silo; wall structure around the shaft defining an upright and downwardly opening material receiving chamber; a radial auger structure extending from the chamber to the wall and adapted to move material from the surface of the silage inwardly to the underside of the chamber, said structure including an overhead laterally extending plate disposed under and for closing the underside of the chamber, said plate having an opening offset to one side of the shaft; conveyor means extending from the chamber to the side discharge opening; impeller means drivingly connected to the shaft for impelling the material from the inner end of the auger structure upwardly through the plate opening and to the conveyor means; and drive means connecting the auger structure to the shaft for causing rotation of the auger structure around the shaft.

2. A silo unloader for use within an upright silo wall having a side discharge opening comprising: an upright drive shaft centrally located in the silo; wall structure around the shaft defining an upright and downwardly opening material receiving chamber; a radial auger structure extending from the chamber to the wall and adapted to move material from the surface of the silage inwardly to the underside of the chamber, said structure including an overhead laterally extending plate disposed under and for closing the underside of the chamber, said plate having an opening offset to one side of the shaft; conveyor means extending from the chamber to the side discharge opening; impeller means including a flipper element drivingly connected to the shaft beneath the plate opening for impelling the material from the inner end of the auger structure upwardly through the plate opening and an impeller blade positioned in the chamber and fixed to the shaft for transferring material to the conveyor means; and drive means connecting the auger structure to the shaft for causing rotation of the auger structure around the shaft.

3. A silo unloader for use within an upright silo wall comprising: an upright support centrally located in the silo and including upright wall structure defining a downwardly opening upright material receiving chamber with lower peripheral edges, the chamber having a side discharge opening spaced from the lower edge; sweep structure including an auger having an inner end adjacent the center of the silo and an outer end adjacent the wall and adapted to move material from the surface of the silage inwardly beneath the chamber, the sweep structure further including a housing means overlying the auger with a laterally disposed overlying panel extending under the chamber in relatively close relation to the peripheral edges, the panel further having a material opening offset to one side of the vertical center of the chamber to thereby close the bottom of the chamber except for the material opening; a flipper blade rotatably supported and driven adjacent the inner end of the auger for driving material vertically through the material opening; an impeller within the chamber adapted for rotation about a vertical axis and having radial arms with lower edges in vertically spaced relation from the panel and substantially at the height of the side discharge opening; means extending from the chamber to the wall for preventing rotation of the chamber; a conveyor supported on the chamber and adapted to receive material from the side discharge opening for receiving material from the impeller and extending therefrom through the silo wall; a power source on the support; and drive means extending from the power source to the sweep structure for effecting movement thereof.

4. A silo unloader for use within an upright silo wall comprising: an upright support centrally located in the silo and including upright wall structure defining a downwardly opening upright material receiving chamber with lower peripheral edges, the chamber having a side discharge opening spaced from the lower edge; sweep structure including an auger having an inner end adjacent the center of the silo and an outer end adjacent the wall and adapted to move material from the surface of the silage inwardly beneath the chamber, the sweep structure further including a housing means overlying the auger with a laterally disposed overlying panel extending under the chamber in relatively close relation to the peripheral edges, the panel further having a material opening offset to one side of the vertical center of the chamber to thereby close the bottom of the chamber except for the material opening; a flipper blade rotatably supported and driven adjacent the inner end of the auger for driving material vertically through the material opening; an impeller within the chamber adapted for rotation about a vertical axis including upper and lower portions and having vertically disposed radial arms, the radial arms of the upper portion being in vertically spaced relation from the panel and substantially at the height of the side discharge opening; the radial arms of the lower portion having lower edges closely adjacent the panel and being inclined whereby the lower edges are in leading relation in respect to the direction of travel; means extending from the chamber to the wall for preventing rotation of the chamber; a conveyor supported on the chamber and adapted to receive material from the side discharge opening for receiving material from the impeller and extending therefrom through the silo wall; a power source on the support; and drive means extending from the power source to the sweep structure for effecting movement thereof.

5. A silo unloader for use within an upright silo wall comprising: an upright support centrally located in the silo and including upright wall structure defining a downwardly opening upright material receiving chamber with lower peripheral edges, the chamber further having a side discharge opening; sweep structure including a sweep conveyor having an inner end adjacent the center of the silo and an outer end adjacent the wall and adapted to move material from the surface of the silage inwardly beneath the chamber; a laterally disposed panel structure adapted to move with the sweep structure disposed under the chamber in relatively close relation to the peripheral edges, the panel further having a material opening offset to one side of the vertical center of the chamber to thereby close the bottom of the chamber except for the material opening; means on the inner end of the sweep structure for moving material through the material opening; means connecting the sweep structure to the support permitting rotation of the sweep structure relative to the support; an impeller within the chamber adapted for rotation about a vertical axis and having radial arms; means extending from the chamber to the wall for preventing rotation of the chamber; a conveying means having an intake end receiving material through the side discharge opening from the impeller and extending therefrom through the silo wall; a power source on the support; and drive means operatively connected to the power source and the sweep structure for effecting movement thereof.

6. The invention defined in claim 5 in which the side discharge opening is vertically spaced above the panel and the radial arms are above the panel and at substantially the same level as the side discharge opening.

7. The invention defined in claim 5 in which the side discharge opening is vertically spaced above the panel and the radial arms are uprightly disposed blades having their lower edges closely adjacent the panel and are advanced in respect to the direction of travel whereby the blades operate upon rotation to raise material and to drive it outwardly.

8. The invention defined in claim 7 in which the blades are composed of upper vertical portions and lower vertically inclined portions, and the upper portions are on the same level as the side discharge opening.

9. A silo unloader for use within an upright silo wall comprising: an upright support centrally located in the silo and including upright wall structure defining a downwardly opening upright material receiving chamber with lower edges, the chamber further having a side discharge opening spaced vertically above the lower edges; sweep structure including a sweep conveyor having an inner end adjacent the center of the silo and an outer end adjacent the wall and adapted to move material from the surface of the silage inwardly beneath the chamber and upwardly into the chamber; means connecting the sweep structure to the support permitting rotation of the sweep structure relative to the support; an impeller within the chamber adapted for rotation about a vertical axis and having radial arm means including upper portions substantially on the level of the side discharge opening and extending substantially to the chamber wall, the arm means further including lower portions inclined to the vertical with their lower edges beneath the level of the side discharge opening and advanced in respect to the direction of travel whereby the arm means operate upon rotation to both raise material to the level of and to drive it outwardly through the side discharge opening; means extending from the chamber to the wall for preventing rotation of the chamber; a conveying means having an intake end receiving material through the side discharge opening and extending therefrom to an outer end adjacent the silo wall; power means on the support; and drive means operatively connected between the power means and the sweep structure for effecting movement thereof.

10. The invention defined in claim 9 in which the upper portions and lower portions of the arm means are continuous with the lower portion being inclined vertically and in advance of the upper portion whereby the lower portion will sweep material upwardly and into the path of the upper portion.

11. The invention defined in claim 9 in which the lower portions are blade elements extending radially in respect to the aforesaid vertical axis to an outer end, and further characterized by having a vertical flange at the outer end projecting in an advance direction so as to interfere with radial movement of material contacted by the lower portion.

References Cited by the Examiner
UNITED STATES PATENTS

| | | | |
|---|---|---|---|
| 3,019,005 | 1/1962 | Van Dusen | 214—17 |
| 3,144,144 | 8/1964 | Sime | 214—17 |
| 3,190,469 | 6/1965 | Huffman | 214—17 |

GERALD M. FORLENZA, *Primary Examiner.*

R. G. SHERIDAN, *Assistant Examiner.*